United States Patent [19]

Senften

[11] 4,034,479
[45] July 12, 1977

[54] INSTRUMENT FOR MEASURING ANGLES AND FOR DETERMINING VEHICLE WHEEL ALIGNMENT CHARACTERISTICS

[75] Inventor: David A. Senften, Florissant, Mo.

[73] Assignee: Hunter Engineering Company, Bridgeton, Mo.

[21] Appl. No.: 675,332

[22] Filed: Apr. 9, 1976

[51] Int. Cl.² .................... G01B 5/24; G01B 7/30
[52] U.S. Cl. ............................................ 33/203.15
[58] Field of Search ........ 33/203.2, 203.18, 203.15

[56] References Cited

U.S. PATENT DOCUMENTS

| 3,393,455 | 7/1968 | MacMillan | 33/203.15 X |
| 3,426,438 | 2/1969 | Wilkerson | 33/203.2 |
| 3,443,318 | 5/1969 | MacMillan | 33/203.18 |

*Primary Examiner*—Harry N. Haroian
*Attorney, Agent, or Firm*—Gravely, Lieder & Woodruff

[57] ABSTRACT

An instrument for measuring angles between relatively movable references, and for use in determining vehicle wheel alignment characteristics. The instrument for measuring angles embodies transducer means having magnetic torque characteristics for sensitivity and simplicity of construction of the mechanical elements used to energize electrical circuit means for driving display means calibrated to read representative values such as angular relationships which can be translated into useful information such as vehicle wheel toe, for example.

4 Claims, 5 Drawing Figures

INSTRUMENT FOR MEASURING ANGLES AND FOR DETERMINING VEHICLE WHEEL ALIGNMENT CHARACTERISTICS

BACKGROUND OF THE INVENTION

While the present improvement has many uses it has special utility in connection with determining vehicle wheel alignment characteristics. Heretofore, means to determine wheel alignment has in many instances moved in the direction of optical systems in which light beams and measuring scales are employed, or has moved in the direction of all mechanical systems. The essence of these systems is that the alignment apparatus employs either an optical or a mechanical reference from which alignment measurements are taken.

The optical system usually employs mirrors and graduated scales upon which a light beam projected from the vehicle's wheels is read by the operator or the light beam is intercepted by photo-electric sensors whose signals are converted into alignment information. When direct reading scales are used, operation is limited by the level of ambient light. Under high ambient light conditions the scales may not be able to be read at all. The use of photo-electric sensors minimizes these problems but makes the equipment much more expensive.

In mechanical reference systems, a physical member is attached to the wheel mounted sensors which establishes the measurement reference. This member may either be a rigid bar extending between the sensors or extending to some external support, or it may be some type of elastic band stretched between the sensors rigid members. Systems using a rigid member tend to be cumbersome and slow in use, and the weight of the various members in such systems tend to put undue stress on instruments which are attempting to make very precise measurements. Elastic bands, while inexpensive, lightweight and easy to use, have two drawbacks. The instruments to which they are attached must be very low torque and the readings are adversely affected by air currents blowing against the elastic band.

SUMMARY OF THE INVENTION

This invention relates to improvements in apparatus for measuring angles and vehicle wheel alignment characteristics, such as wheel toe, center point steering, wheel setback and wheel tracking.

The operation of vehicles is greatly facilitated, from the operators viewpoint, when the front and rear wheels track properly and when the steerable wheels are maintained within the toe-in alignment specified by the maker. It is also very desirable to have the steering wheel substantially centered to the longitudinal center line so the operator will know or sense when the wheels are in a straight ahead position. Toe-in and center point steering are closely related for the reason that when the steerable wheels are properly toed-in they will tend to hold the vehicle to movement parallel to its longitudinal axis which establishes a straight ahead line of travel, and in this condition the steering wheel is found to be in a position where the wheel spokes or cross bar is symmetrically level with the longitudinal center line of the vehicle. On the other hand, if the front wheels do not have the axis of rotation aligned and perpendicular to the longitudinal axis of vehicle the vehicle will not run with the front and rear wheels tracking each other. A similar condition can be encountered if the axle for the rear wheels is not perpendicular to the longitudinal axis. Both of these conditions are known as set back which means one front or rear wheel is out of alignment with the wheel on the other side.

It is an important object of this invention to provide apparatus that will make it easy to measure angular relationships between a fixed reference and a movable reference, or determine toe-in alignment as well as center point steering, and related vehicle wheel alignment characteristics.

Still another object of this invention is to provide low cost electro-mechanical angle apparatus involving position sensitive transducer means amenable to changes in the positions of fixed and movable references, whereby mechanical means may be employed with electrical sensing and read-out means to achieve greatly improved accuracy of results with inexpensive components.

A presently preferred embodiment of this invention comprises electro-mechanical transducer means consisting of a primary lever mounted on a support having a known position of reference, a secondary lever coupled to the primary lever through a magnetic field and a resilient mechanical means, first circuit means connected into the magnetic field for the secondary lever to vary the field strength, second circuit means controlled by the position of the secondary lever to shift the voltage in the first circuit means selectively to the positive or negative side of a neutral position, and means connected to the primary lever to move it to positions requiring measurement.

BRIEF DESCRIPTION OF THE DRAWINGS

The embodiments of this invention presently preferred are shown in the accompanying drawings, in relation to vehicle wheel alignment applications, wherein.

DETAILED DESCRIPTION OF THE EMBODIMENTS

Figure 1:
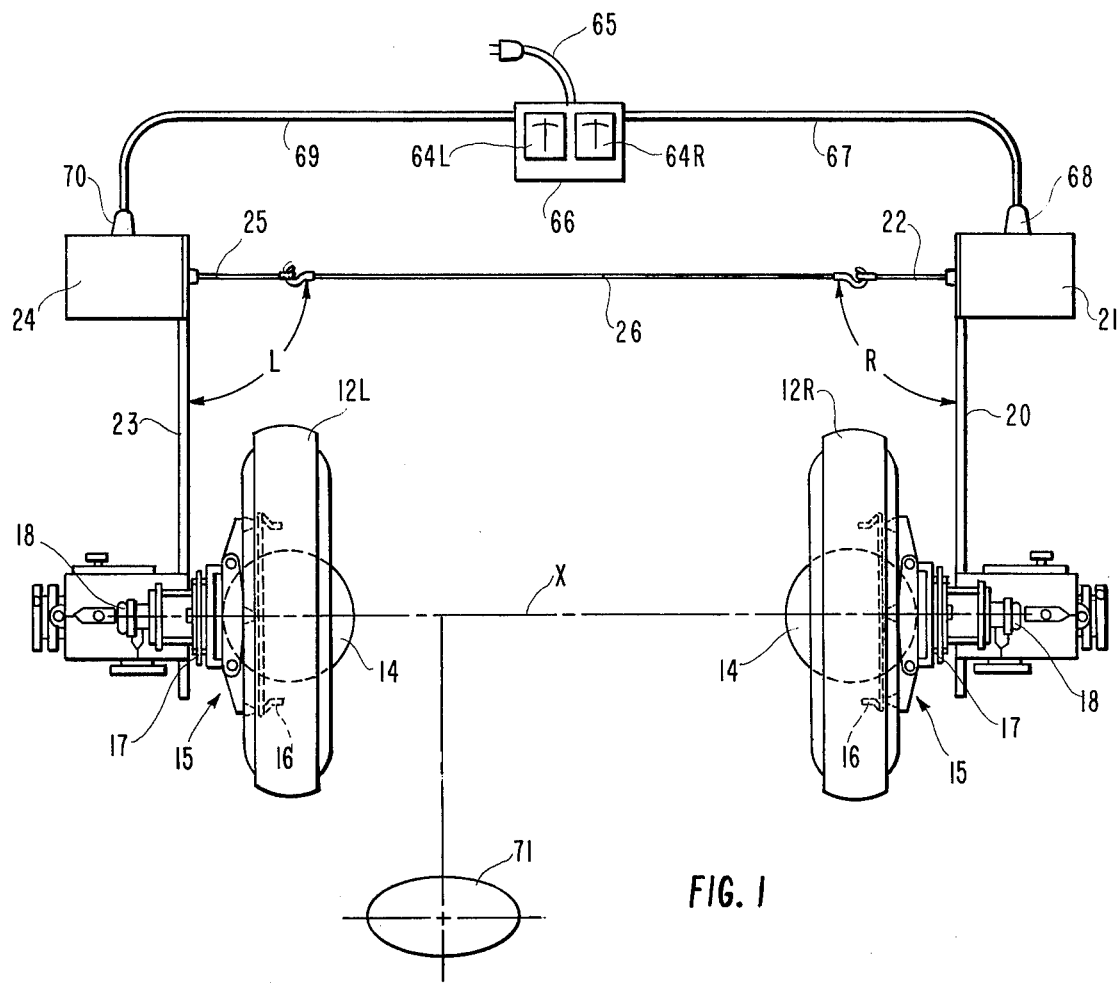
FIG. 1 is a schematic plan view of the steerable wheels for a vehicle showing the various components of the apparatus in operative association with the vehicle wheels.

The vehicle, represented in FIG. 1 by a pair of steerable front wheels 12R and 12L is placed on a level service area so its wheels rest on turn plates 14. If the service area is equipped with a hoist or rack, the vehicle is placed on that type of equipment so it may be lifted off its wheels when necessary. The turn plates 14 may be placed on the hoist or racks as it will be necessary to turn the wheels into a straight ahead position at the required time in the testing or determining of alignment characteristics. Turn plates 14 are not necessary as the wheels can be turned without the aid of such plates.

A first step in determining wheel alignment characteristics is to mount the alignment monitoring instrument adapters 15 (FIG. 1) on the wheel rims 16 by engaging the rim gripping elements on the wheel rims. Usually at least three such elements are provided. The adapters are similarly constructed and have a suitable spindle for pendulously supporting instrument heads 17 having run-out compensating knobs which can be adjusted so that spirit levels 18 in the heads 17 remains substantially centered while the wheels 12R and 12L are rotated. This places the heads 17 in the plane of wheel rotation, and the angle measuring instruments carried by these heads will be similarly located.

The head 17 for the right front wheel 12R (FIG. 1) is provided with a bar 20 which projects forwardly so its outer end is clear of the wheel 12R. A wheel alignment monitoring transducer box 21 is fixed on the outer end of bar 20 so a sensor pig tail 22 is on the side facing the opposite wheel 12L. The head 17 for the left front wheel 12L (FIG. 1) supports a bar 23 which also projects forwardly to clear the wheel 12L. A wheel alignment monitoring transducer box 24 is carried on this bar 23 with a pig tail 25 projecting out on the side facing the opposite pig tail 22. The pig tails are interconnected by an elastic cord 26 which can be related as desired with the reference axis X representing the normal alignment for the usual spindles supporting the wheels 12R and 12L.

Figure 2:
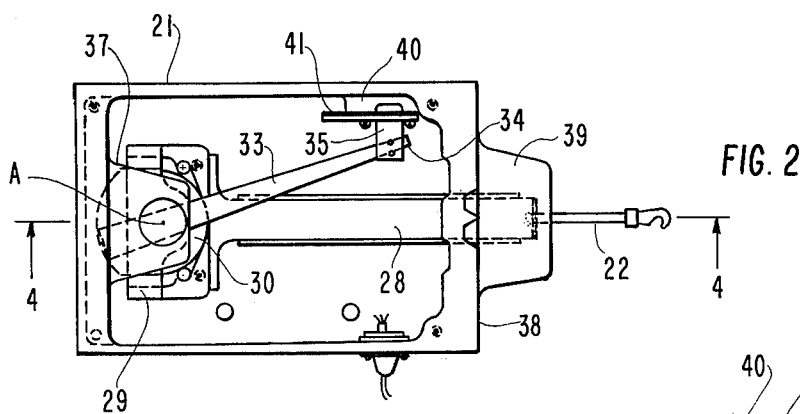
FIG. 2 is a plan view of the angle measuring instrumentation for the right front wheel with the cover removed to reveal the internal mechanism.
Figure 3:
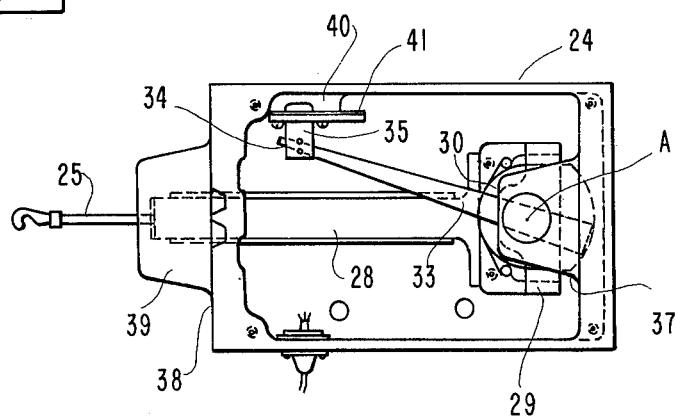
FIG. 3 is a plan view similar to FIG. 2, but with the mechanism reversed in position for use with the left front wheel.
Figure 5:
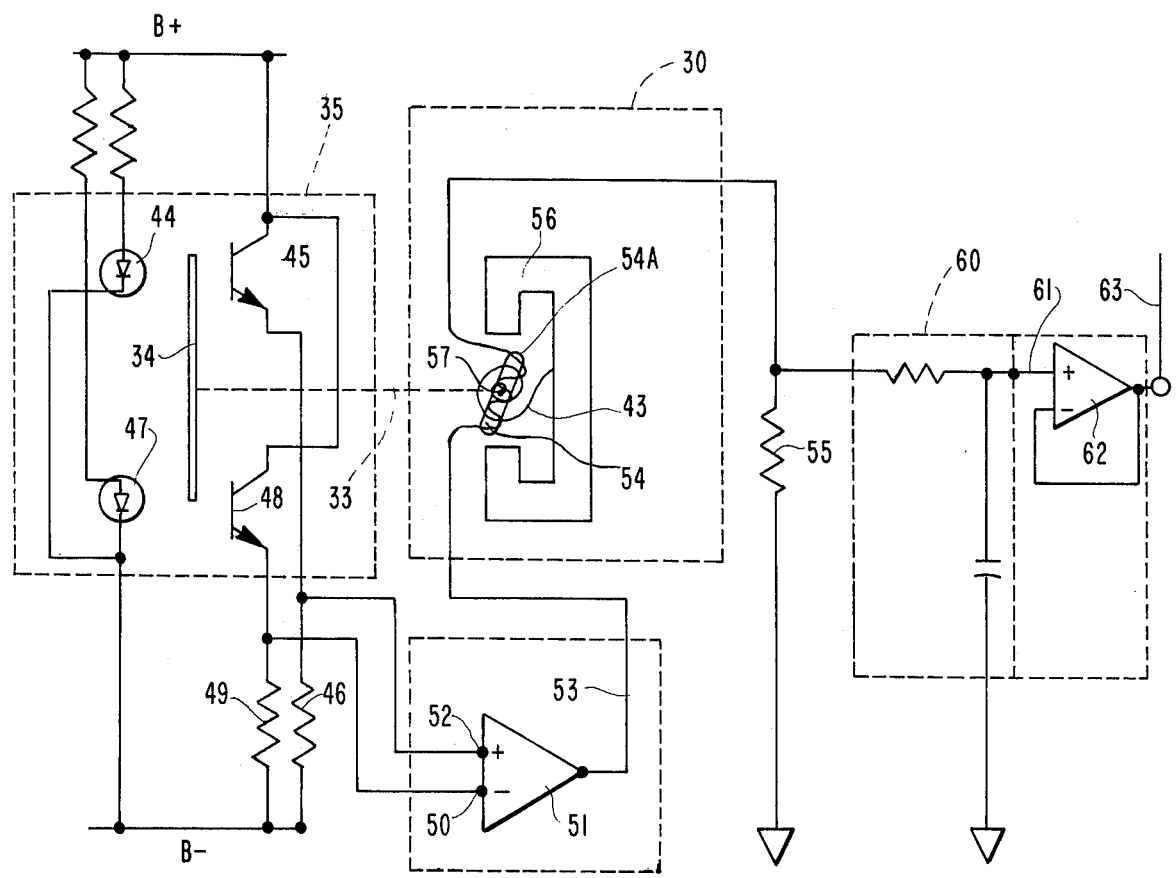
FIG. 5 is a schematic wiring diagram for the circuits in the angle measuring instrumentation mechanisms of FIGS. 2 and 3.

The alignment monitoring transducer boxes are coupled together by the elastic cord 26 and the pig tails 22 and 25 because of low cost, light weight and ease of use. The coupling in this manner is such as to circumvent the problems concomitant with the prior use of an elastic cord reference. The views of FIGS. 2 and 3 are presented with the box covers removed to reveal internal details. The pig tail 22, in the case of box 21, is attached to a primary lever 28 and this lever is attached to a support yoke 29 which provides the mounting means for an electro-mechanical transducer in the form of a torque producing means 30. This entire assembly of lever and yoke is supported on low torque pivots 31 having the pivot axis A spaced from the end wall 32 of the box 21. The torque producing means 30 cooperates with a secondary lever 33 which is movable with and relative to the means 30 and is composed of some opaque material. The secondary lever 33 is positioned so that its end portion 34 is disposed between the emitters and detectors of a dual channel interrupter module 35, the circuit for which is seen in FIG. 5.

As pointed out above the electro-mechanical transducer 30 is associated with primary and secondary levers coupled through a magnetic field and resilient mechanical means, the details of which are as follows with reference to FIGS. 4 and 5: The primary lever 28 is rigidly attached to the hollow body member 30A of a well known D'Arsonval galvanometer. That body member is attached to a supporting yoke 29 which, in turn, is mounted in the box 21 on a lower pivot 31 and on an upper pivot 31 mounted in the tab 37 of wall 32. The pivots 31 establish an axis for pivoting movement of the body 30A and the primary lever 28. There is an inner element 30B supported by and spaced from the inside of the body 30A, and a permanent magnet connects the inner element to the inside of the body 30A so that an annular space is formed around the element. The magnet polarizes the inner element 30B and the surrounding body 30A, thereby making them pole pieces to create a magnetic field in the annular space. An armature coil (54 in FIG. 5) is mounted in the magnetic field in the body 30A to pivot about its own axis which is centered to the annular magnetic field. The coil is spring loaded (43 in FIG. 5) to hold a predetermined position in the annular magnetic field and can be swung in either direction from that position. The secondary lever 33 is connected to the coil or is operatively responsive to movement of the coil so movement of the coil moves lever 33. As seen in FIG. 5 the coil 54 and lever 33 are coupled together, and the coil 54 is in the magnetic field of magnet 56 which is representative of the inner element 30B and body 30A referred to above.

Figure 4:
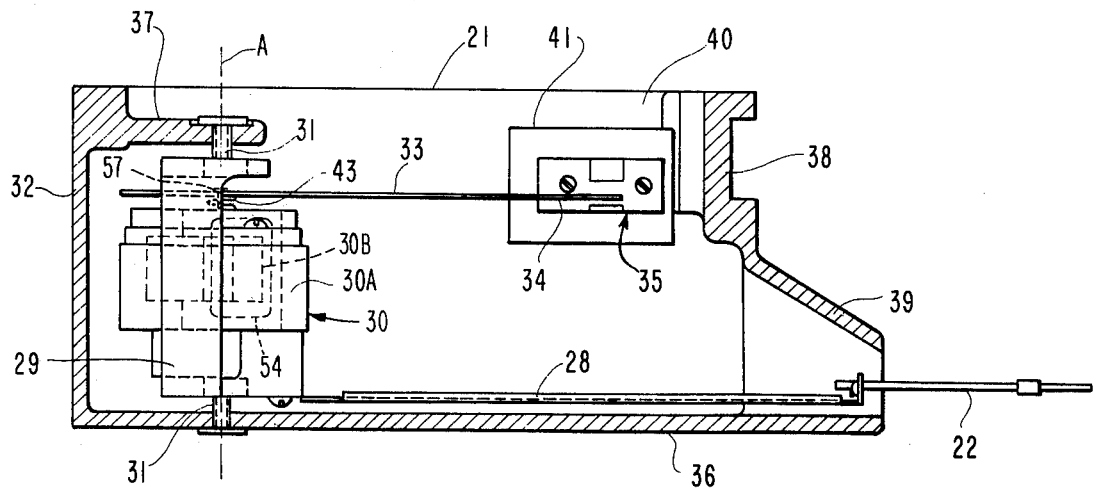
FIG. 4 is a fragmentary sectional view taken along line 4—4 in FIG. 2 and is typical of the structure for the instrumentation of such mechanism.

The box 21 is seen in sectional elevation in FIG. 4 and is formed with a bottom 36, an end wall 32 which supports a tab 37 to carry the upper pivot 31, and a front wall 38 formed with a projecting open guide 39 for allowing the end of the lever 28 to project to a position where the pig tail 22 can be connected. The box also is formed with an internal boss 40 which provides a suitable mounting means for a circuit board 41. The box 24 seen in FIG. 3 has the same features but is formed for the opposite hand assembly of the same make-up of components noted for box 21.

In operation, of lever 28 in box 21 is rotated slightly counterclockwise the end 34 of lever 33 will move in the same direction due to the urging of a resilient coupling means in the form of torsional spring 43 between body 30 which carries lever 28 and lever 33 which is responsive to the position of the coil 54. The outer end 34 of lever 33', thereby tends to block the emission from emitter 44 to detector 45 (FIG. 5) of the current source B+. This loss of emission at detector 45 tends to cause the electrical current through the detector 45 to decrease due to the natural characteristics of the device. The electrical current in detector 45 must pass through resistor 46 to the other side B−. The reduction in electrical current in detector 45 therefor causes a reduction in electrical current in resistor 46. This reduces the voltage developed across resistor 46 because of the fundamental electrical relationship voltage equals current times resistance.

At the same time the new position of lever end portion 34 will tend to unblock the emission from emitter 47 to detector 48. The increased emission falling on detector 48 causes an increase in the electrical current through that detector. The electrical current in detector 48 must pass through resistor 49 and is therefor increased. Likewise, this causes the voltage developed across resistor 49 to increase proportionally by the same fundamental relationship as described above. The emitters and detectors selected for use in this device are infra red sensitive.

The two similtaneous events discussed above cause the voltage at the negative input 50 of the error amplifier 51 to be more positive than that at positive input 52. This condition, because of the well known properties of differential amplifiers, causes the amplifier output voltage at lead 53 to be lowered. The amplifier output lead 53 is connected directly to one end of the coil winding 54 of the torque producing element 30. The other end of coil winding 54 is connected to current sensing resistor 55. From this arrangement, as shown in FIG. 5, it can be seen that because of the lowered voltage at the output of amplifier 51 an electrical current will flow through coil winding 54 and current sensing resistor 55. The winding 54 is mounted on core 54A in the usual manner. The current flowing in the coil 54 produces a magnetic field which couples with the permanent magnetic field of magnet 56, and the magnetic couple tends to rotate the shaft 57 for lever 33 against the restraint of the torsional spring 43, so as to return the tip 34 of the secondary lever 33 to its original position and bring the voltage inputs 50 and 52 to error amplifier 51 into balance. When this has been accomplished, the voltage developed across the current sensing resistor 55 will be a direct indication of the original movement of lever 28. This is true because the tip 34 of lever 33 will have returned to its original position, and this means the shaft 57 of the torque producing element 30 has rotated back the same amount that lever 28 was rotated initially. The torque produced by torsional spring 43 is linear with respect to this shaft rotation and is therefore directly proportioned to the movement of lever 28. The torque produced by the current through the coil 54 has also a direct linear relationship and of course must equal exactly the torque developed by the torsional spring 43 so that the system will be held in equilibrium. Finally the voltage developed across the current sensing resistor 55 is directly proportional to the movement of lever 28 because of the electrical relationship discussed above. The circuit of FIG. 5 is carried on a circuit board 41 mounted in the box 22.

This voltage across resistor 55 is passed through a resistor capacitor smoothing filter 60 to remove extranious pulsations and fluctions which occur during the balancing of the system as described above. The filter does not effect the average value of the voltage developed across resistor 55 which is then passed along to the input 61 of a buffer amplifier 62. Buffer amplifier 62 is a differential amplifier connected in the traditional voltage follower mode. This well known circuit effectively repeats the voltage level at the input 61 and supplies it at its output 63 while acting as a buffer to prevent any external circuitry from loading down the active circuitry described. The voltage signal thus available at buffer amplifier output 63 may be connected to any additional circuitry to fulfill a given function or it may be connected directly to a volt meter scaled to give a visual indication of the angular motion experienced by primary lever 28.

The foregoing description of the monitoring transducer in box 21 and its circuit of FIG. 5 will apply equally well to the monitoring transducer in box 24 (FIG. 3) for the left front wheel 12L, and similar reference numerals have been applied to similar parts and elements. It is to be understood that the circuit for the monitoring transducer in box 24 is mounted on a circuit board 41 (FIG. 3).

FIG. 1 shows a power supply 65 leading into a cabinet 66 which contains display meters 64L and 64R. Lead 67 containing 3 wires extends into box 21 at plug 68, and appropriate circuit connections (not shown) are made so that DC current is available to the module 35 and positive and negative voltage can be fed to the display meter 64R. Similarly lead 69 contains 3 wires and connects at plug 70 for box 24 so that DC current is available to the module 35 for that box 24. It is understood that the display meters 64R and 64L must be able to swing to either side of a zero position in order to properly monitor the position of the steerable wheels 12R and 12L in relation to the values of the angles R and L. These angles are translated into wheel toe measurements.

After the front wheels have been monitored for alignment characteristics at meters 64R and 64L, the service operator is ready to test for center point steering. This test is accomplished by looking at the cross bar or spokes of the steering wheel 71, and if it is not level or centered, the wheel must be turned to get it in that position. The turning of the steering wheel 71 will cause a response in the display meters 64R and 64L which usually results in out of balanced readings. Now the service operator has conditioned the vehicle wheels 12R and 12L for center point steering adjustment which is performed under the vehicle by adjusting the tie rod sleeves until the display meters read out the required toe-in for that vehicle. The sleeve adjustment is complete when the meters 64R and 64L display similar readings.

The foregoing description has set forth a preferred embodiment of measuring instrument for determining the angular relation between a body, such as surface 38 of box 21, and an angularly movable reference line, such as the lever 28 and cord 26. In broad terms, the present instrument comprises a primary lever 28 extending in a direction which may be perpendicular normally to the reference surface 38, a secondary lever 33 adjacent the lever 28, a torsion spring 43 interconnecting the levers 28 and 33 to hold the levers normally in a predetermined relationship (FIGS. 2 or 3) and to transmit motion of lever 28 to lever 33, magnetically responsive means operatively coupling the levers, dual channel photo interrupter means 35 responsive to movement of the lever 33 to influence the magnetically responsive coupling in counteraction to the torsion spring so as to return the lever 33 to its position where the end portion 34 balances the effect of the dual channel photo interrupter means, and electrically responsive means connected to the magnetically responsive means to display the extent of movement of lever 28 in terms scaled to the angular displacement thereof from its normal position.

The present instrument has several uses, one of which is shown in FIG. 1 as applied to the chore of determining vehicle wheel alignment characteristics. Thus, in FIG. 1 the meters 64R and 64L can be scaled to read the angular relations at R and L between the bars 20 and 23 and the interrelating cord 26. For wheel toe-in the angles R and L should be greater than 90°, and the meters show this result in terms of fractions of an inch. When toe-in is correct, the meters 64R and 64L should read alike. When checking center point steering at steering wheel 71 the turning of the steering wheel 71 may cause one wheel to turn out such that the angle R or L will be less than 90°. This result will show up at meters 64R and 64L which will not be balanced.

What is claimed is:

1. A measuring instrument for determining the angular relation between a body under investigation and a reference line, said instrument comprising: support means attached to the body and having a surface representative of the position of the body; torque producing electro-magnetic means pivotally carried by said support means and including a magnet creating a magnetic field between its poles, a coil operably located in said magnetic field and movable in said magnetic field upon current flow in said coil creating magnetic coupling effects, and resilient means connected to said coil and locating said coil in said magnetic field in a predetermined normal position; a dual channel interrupter module carried by said support means and including a pair of spaced signal emitters and corresponding signal detectors; an interrupter means normally located in the spaced between said emitters and detectors to intercept signals substantially equally from said emitters, said interrupter being connected to said coil to move in response thereto; a source of direct current connected to said signal emitters and detectors; an amplifier having positive and negative current inputs and an output, said inputs being connected in circuit with separate ones of said detectors and said output being in circuit with said coil; first lever means representative of the reference line and fixed to said torque producing electro-magnetic means to move the same relative to said representative surface on said support means to an angle requiring determination, said first lever having an initial position relative to said interrupter means; pivot forming means carried by said torque producing electro-magnetic means in position to interconnect said interrupter means and said coil, said pivot forming means moving with said torque producing electro-magnetic means and displacing said interrupter means, whereby said emitter signals are unbalanced and current to said coil changes the magnetic field coupling to return said interrupter to its normal location resulting in said first lever means and interrupter means assuming a different relationship; and means responsive to changes in the current in said coil to display the amount of relative change in the initial position of said first lever means relative to said interrupter means in terms of angular displacement of said first lever means from said representative surface.

2. A measuring instrument for determining the angular relation between a body and an angularly movable reference line, the instrument being carried by the body, said instrument having a support formed with a reference surface representative of the position of the body, magnetically responsive means pivotally carried by said support, a primary lever connected to said magnetically responsive means and extending in a direction at an angle to said reference surface to represent the reference line, a secondary lever normally operably magnetically coupled with said magnetically responsive means to move with and relative thereto, resilient means interconnecting said magnetically responsive means and said secondary lever and normally holding said secondary lever in a predetermined position whereby motion of said primary lever is mechanically transmitted to said secondary lever, dual channel photo interrupter means adjacent said secondary lever to be normally interrupted thereby and rendered responsive to movement thereof, circuit connections between said dual channel interrupter means and said magnetically coupled secondary lever to exert a magnetic coupling influence in counteraction to said resilient means so as to return said secondary lever to its position normally interrupting said interrupter means, and electrically responsive display means connected into said magnetically responsive means to display the extent of relative movement between said primary lever and secondary lever in terms of angular displacement from said normal predetermined relationship.

3. An instrument for displaying the amount of angular displacement between two reference members, said instrument comprising: a support movable with one reference member; a permanent magnet pivotally carried by said support; a primary arm attached to said permanent magnet to move said magnet in assuming a position angularly displaced relative to said support; a coil pivotally carried by said permanent magnet and free to move in the magnetic field thereof in opposite directions in response to the current flow therein producing a magnetic field coupling proportional to the current flow; resilient means connecting said coil to said magnet; a source of current; circuit means connecting said current source with said coil and including a dual channel interrupter module having signal emitters and cooperating signal detectors in spaced relation; a secondary arm connected to move with said coil and normally positioned by said resilient means to block signals between said emitters and detectors in the null position of said coil in the magnetic field; an error amplifier in said circuit means controlling the current flow through said coil to influence the magnetic field coupling in response to movement of said primary arm relative to said support, whereby said secondary arm is initially moved away from its normal position to unblock said signals and cause current flow in said coil to restore said secondary arm to its normal position; and means connected into said circuit means to display the amount of movement of said secondary arm in terms of the displacement of said primary arm relative to said support means.

4. Vehicle wheel alignment determining apparatus comprising support means attached to a pair of wheels on opposite sides of the vehicle, arms on said support means positioned to extend along side the plane of rotation of the wheels and in a direction to be clear of the wheels and be in opposed relation, motion responsive means carried by each arm and each having a principal lever operably mounted therein to move angularly relative to said arm, flexible cord means interconnecting said principal levers across the width of the vehicle, electrical components in said motion responsive means responsive to movement of said principal levers, said electrical components including permanent magnetic means pivotally carried by said motion responsive means and connected to and movable with said principal levers, coil means pivotally mounted in said permanent magnetic means to move in the magnetic field in opposite directions from a balanced magnetic field coupling position; circuit means connected to said coil means and including dual channel interrupter modules having signal emitters and cooperating signal detectors in spaced relation and error amplifiers controlling the current flow through said coils to influence the action of said coil magnetic fields in the magnetic fields of said permanent magnetic means in proportion to the movement of said principal levers; secondary lever means connected to said coil means and normally interrupting the signals between said emitters and detectors, said secondary lever means being moved out of said normally interrupting positions upon pivoting movement of said principal lever means to influence the current flow in said coil means; and display means connected to said electrical components and positioned to be viewed remotely from the vehicle whereby motion of said principal levers can be followed.

* * * * *